(12) United States Patent
Etoh

(10) Patent No.: US 7,633,907 B2
(45) Date of Patent: Dec. 15, 2009

(54) RADIO LAN SYSTEM IMPLEMENTING SIMULTANEOUS COMMUNICATION WITH DIFFERENT TYPES OF INFORMATION AND COMMUNICATION METHOD FOR THE SAME

(75) Inventor: Hiroshi Etoh, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 520 days.

(21) Appl. No.: 11/446,410

(22) Filed: Jun. 5, 2006

(65) Prior Publication Data

US 2006/0224755 A1    Oct. 5, 2006

Related U.S. Application Data

(62) Division of application No. 10/131,143, filed on Apr. 25, 2002, now Pat. No. 7,058,113.

(30) Foreign Application Priority Data

May 2, 2001  (JP) ............................. 2001-135182

(51) Int. Cl.
*H04B 7/216* (2006.01)
(52) U.S. Cl. .................. 370/335; 455/320; 455/329; 455/338; 455/341; 455/342; 455/41.2; 455/41.3; 455/450; 455/451; 455/452.2
(58) Field of Classification Search ............... 370/329, 370/335, 338, 320, 341, 342; 455/41.2, 41.3, 455/450–453
See application file for complete search history.

(56) References Cited

U.S. PATENT DOCUMENTS

| | | | | |
|---|---|---|---|---|
| 5,438,589 A | | 8/1995 | Nakamura | 375/145 |
| 5,668,880 A | * | 9/1997 | Alajajian | 370/342 |
| 5,796,727 A | * | 8/1998 | Harrison et al. | 370/338 |
| 5,870,385 A | | 2/1999 | Ahmadi et al. | 370/252 |
| 5,883,899 A | * | 3/1999 | Dahlman et al. | 370/468 |
| 6,130,896 A | | 10/2000 | Lueker et al. | 370/469 |

(Continued)

FOREIGN PATENT DOCUMENTS

JP    6315020    11/1994

(Continued)

OTHER PUBLICATIONS

"Part 11: Wireless LAN Medium Access Control (MAC) and Physical Layer (PHY) Specifications" *IEEE Std 802.11* (1999 Edition) pp. 1-97, United States, (Aug. 20, 1999).

*Primary Examiner*—Stephen M D'Agosta
(74) *Attorney, Agent, or Firm*—Rabin & Berdo, PC

(57) ABSTRACT

A radio LAN (Local Area Network) system includes an access point and a mobile or a fixed station each having a physical layer implemented by a direct spread spectrum system. The LAN system uses different spread codes, maintains transmission power semi-fixed, and selects a frequency and a frequency band in accordance with the kind and amount of information. A data link layer above each physical layer includes an LLC (Logical Link Control) sublayer and an MAC (Media Access Control) sublayer. The MAC sublayer uses a CDMA (Code Division Multiple Access) system as an access system for thereby implementing a data structure in accordance with the kind and amount of information.

8 Claims, 11 Drawing Sheets

U.S. PATENT DOCUMENTS

| | | | |
|---|---|---|---|
| 6,801,776 B2 * | 10/2004 | Notanii et al. | 455/451 |
| 6,909,905 B2 * | 6/2005 | Umeda et al. | 455/522 |
| 7,142,867 B1 * | 11/2006 | Gandhi et al. | 455/453 |
| 2003/0036374 A1 | 2/2003 | English et al. | 455/403 |
| 2003/0193946 A1 | 10/2003 | Gernert et al. | 370/389 |
| 2004/0170154 A1 | 9/2004 | Carter et al. | 370/338 |

FOREIGN PATENT DOCUMENTS

| | | |
|---|---|---|
| JP | 7058723 | 3/1995 |
| JP | 7123025 | 5/1995 |
| JP | 10-32579 | 2/1998 |
| JP | 11112466 | 4/1999 |

\* cited by examiner

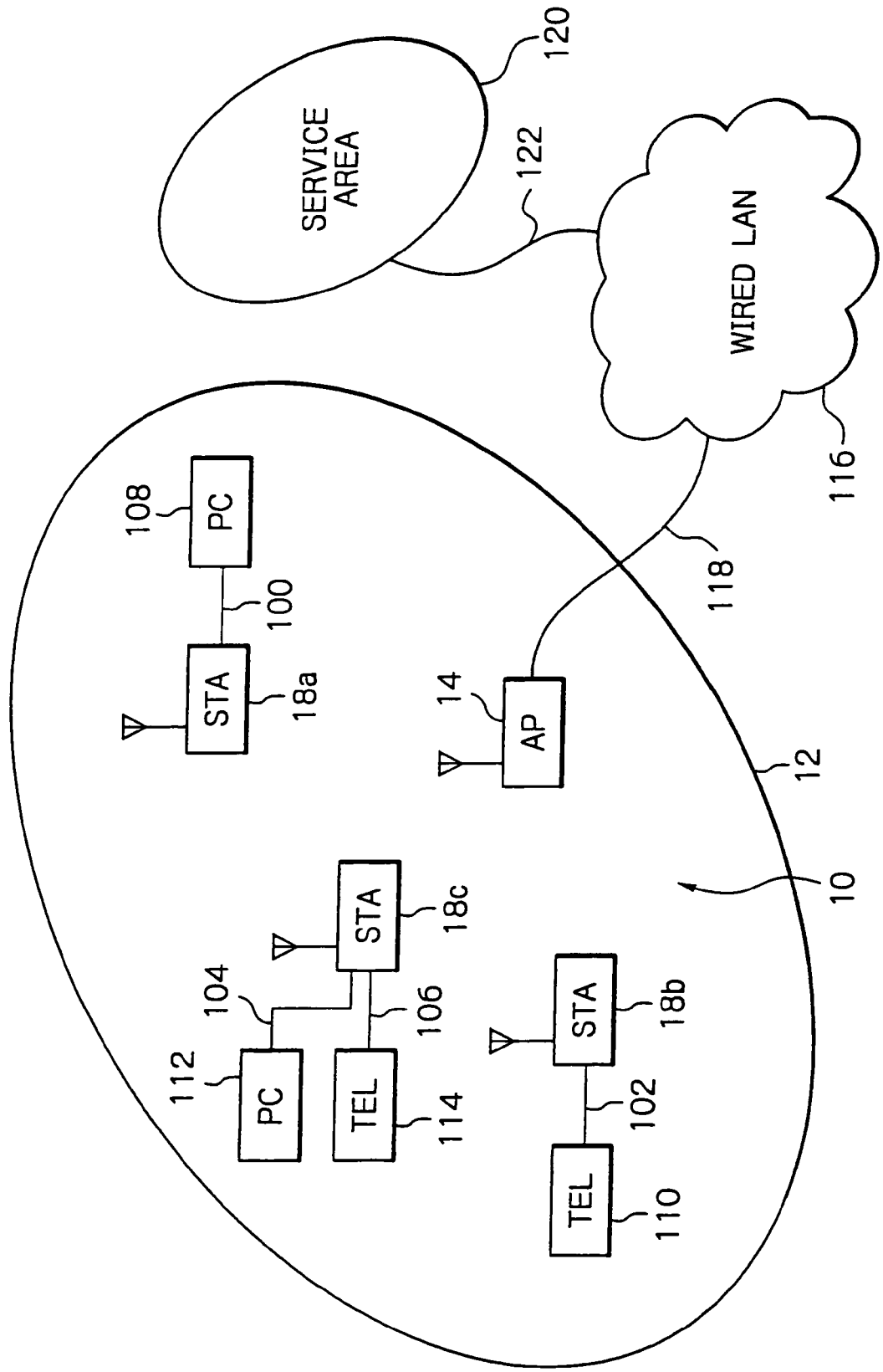

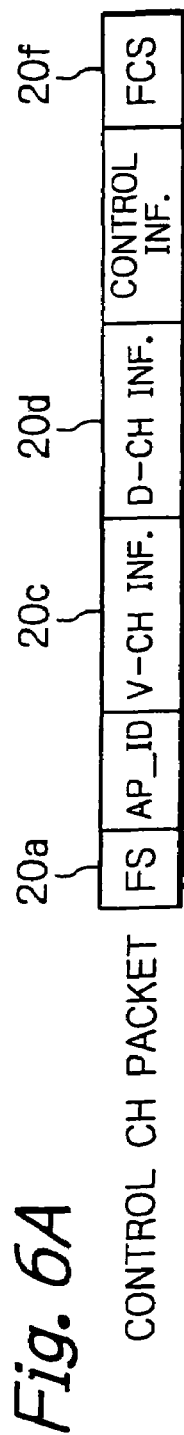
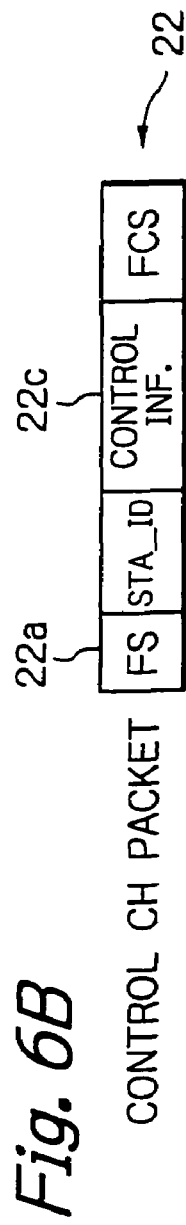
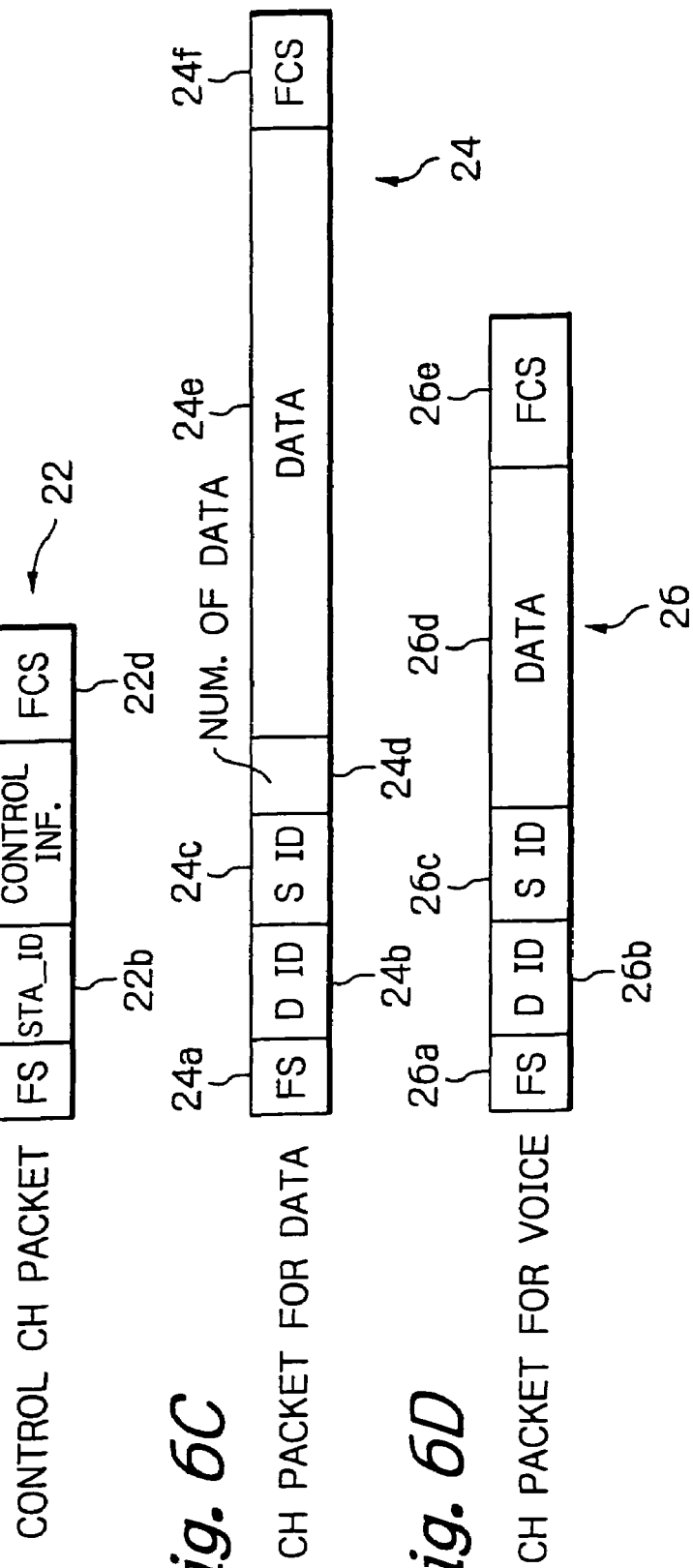
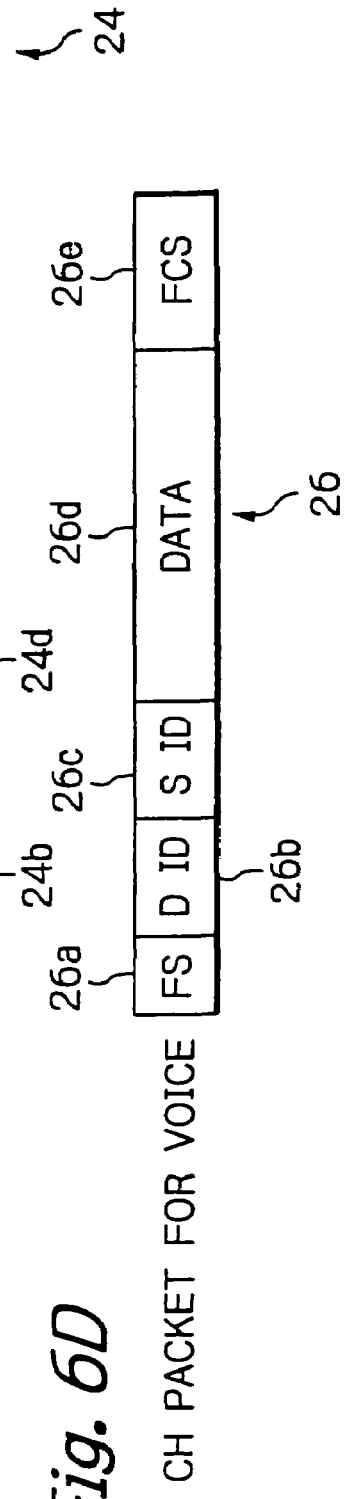
Fig. 6A  CONTROL CH PACKET
Fig. 6B  CONTROL CH PACKET
Fig. 6C  CH PACKET FOR DATA
Fig. 6D  CH PACKET FOR VOICE

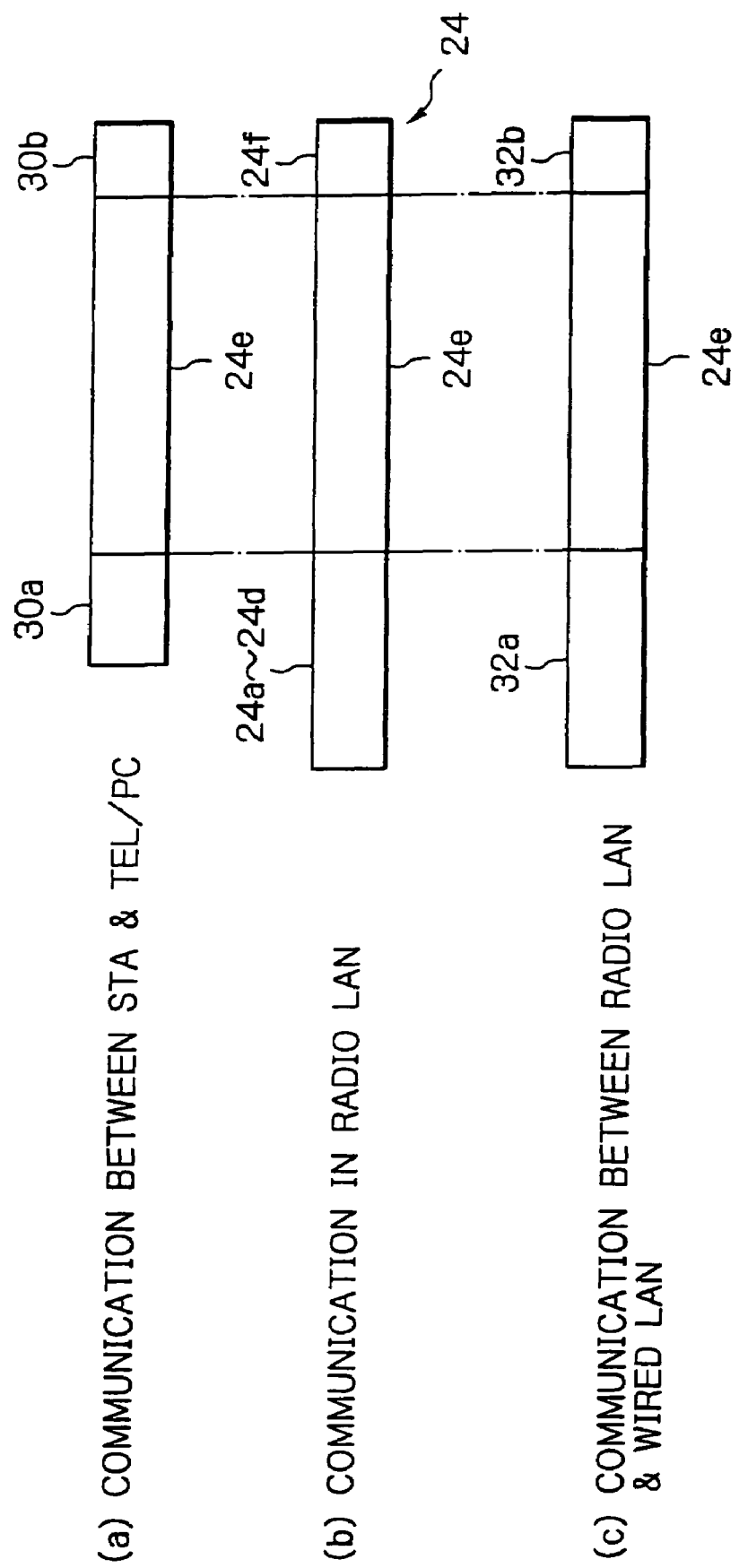

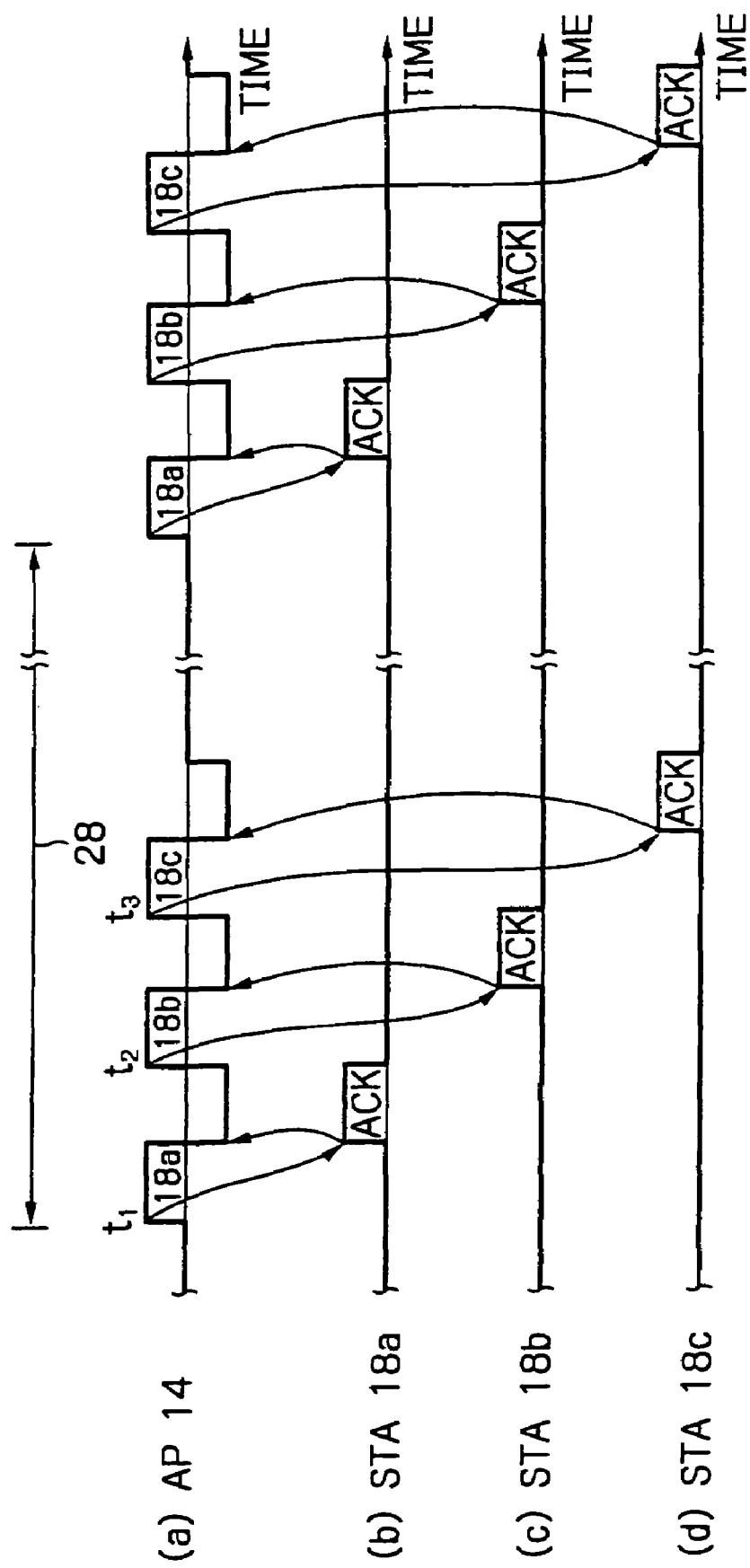

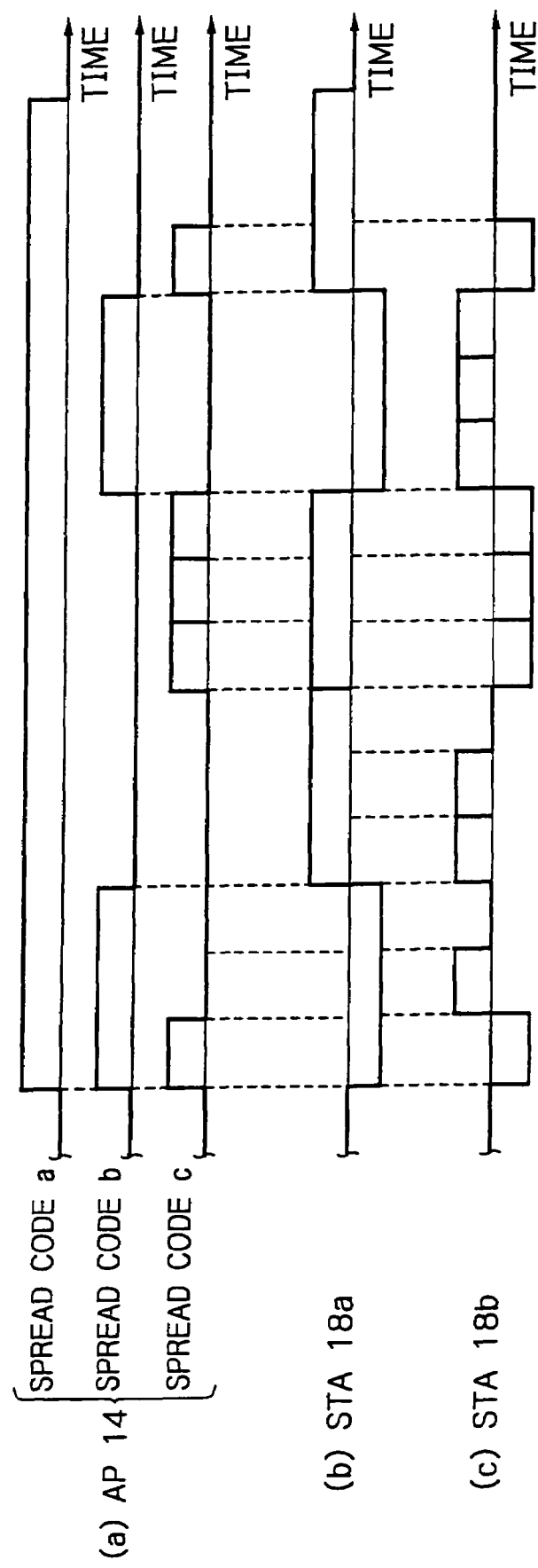

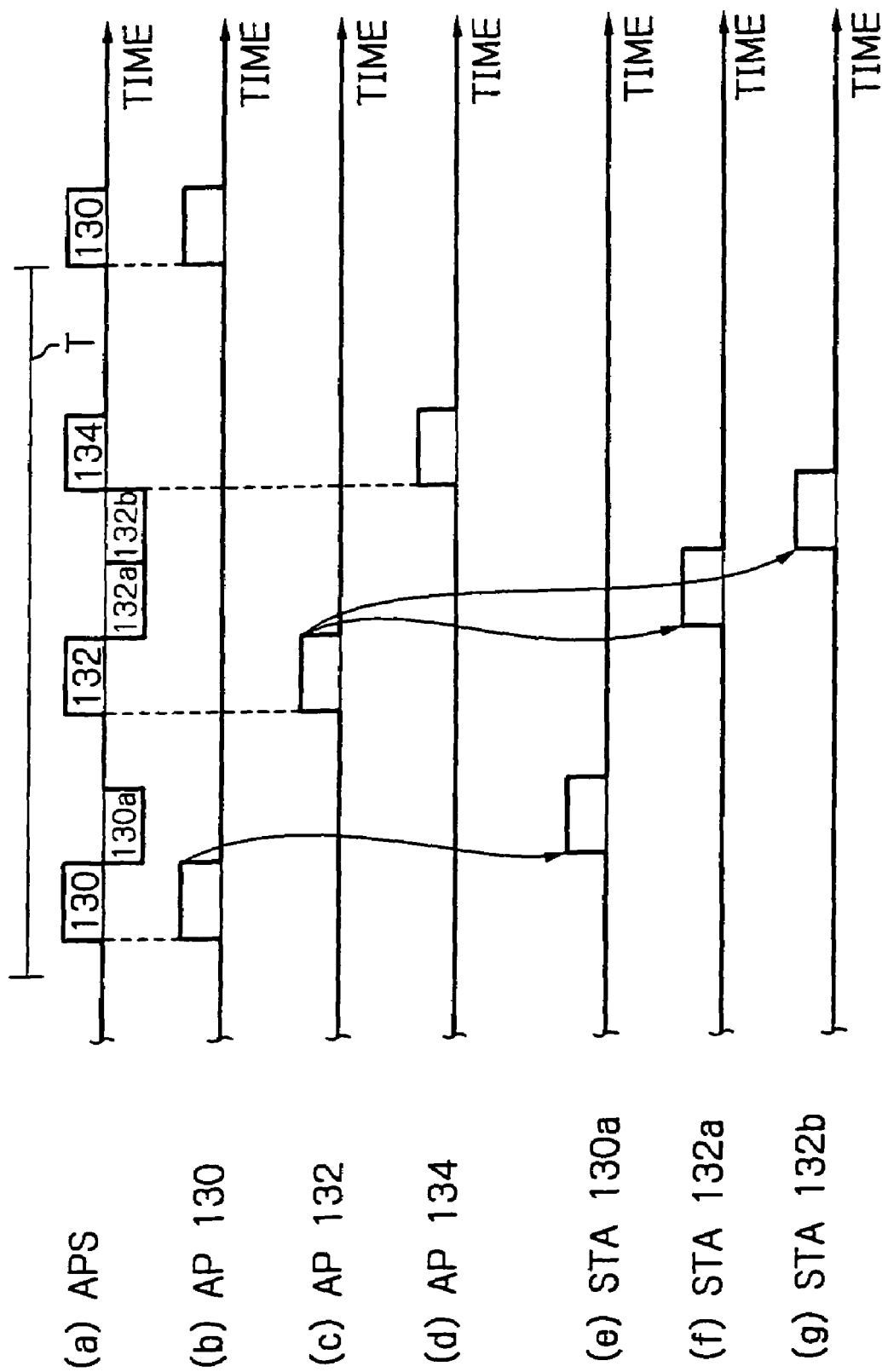

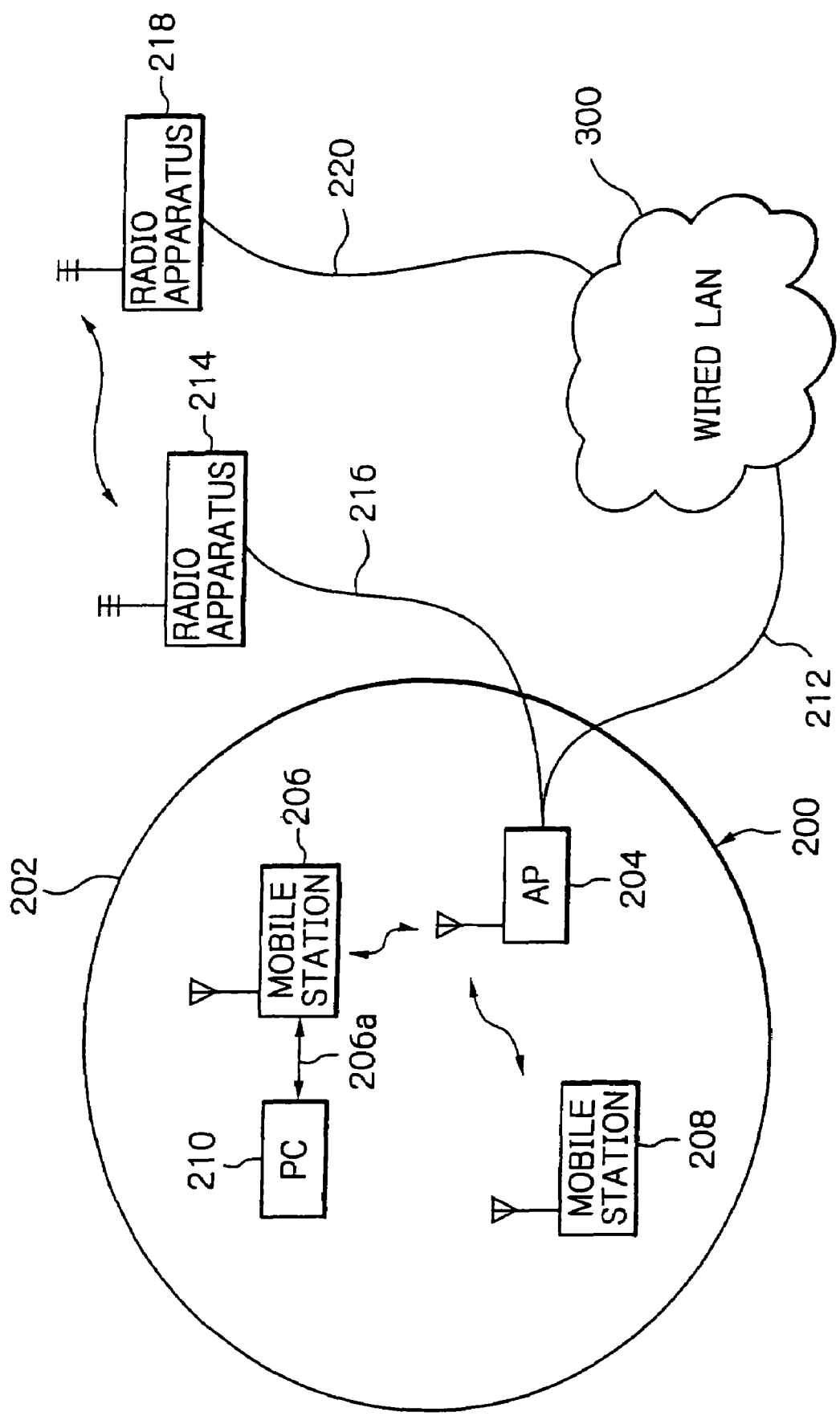

RADIO LAN SYSTEM IMPLEMENTING SIMULTANEOUS COMMUNICATION WITH DIFFERENT TYPES OF INFORMATION AND COMMUNICATION METHOD FOR THE SAME

CROSS-REFERENCE TO RELATED APPLICATIONS

This application claims the benefit of priority of U.S. patent application Ser. No. 10/131,143, filed Apr. 25, 2002 now U.S. Pat. No. 7,058,113, of which it is a divisional application.

BACKGROUND OF THE INVENTION

1. Field of the Invention

The present invention relates to a radio LAN (Local Area Network) system and a communication method therefor.

2. Description of the Background Art

The radio LAN system is advantageously applicable to private premises in which an access point forms a service area and communicates with stations lying in the service area by radio. The communication method is advantageously applicable to a multimedia communication procedure.

A radio LAN system constructed in private premises has customarily used a system prescribed by IEEE (Institute of Electrical and Electronics Engineers) 802.11b. This system is unique in that a direct spread spectrum scheme is applied to a radio system and in that a CSMA/CA (Carrier Sense Multiple Access/Collision Avoidance) scheme is applied to a multiplexing system. The CSMA/CA scheme is desirable because transmitted power in a radio LAN system is generally far greater than received power and cancels received power to thereby obstruct collision detection.

The CSMA/CA scheme has two different access systems, i.e., a DCF (Distributed Coordination Function) access system and a PCF (Point Coordination Function) access system. The DCF access system uses the concept of LAN and does not need an access point, which the PCF access system needs. Today, the direct spread spectrum system is applied to cellular phones because it is highly resistive to noise and interference and desirable in secrecy.

On the other hand, an access point or radio LAN base station and mobile stations are sometimes constructed into a single radio LAN system. This kind of radio LAN system has a single spread code and therefore uses a CSMA/CD (Carrier Sense Multiple Access/Collision Detection) scheme as a multiplexing system. The CSMA/CD scheme causes any one of the stations to make an access after determining whether or not another station is emitting a radio wave. Therefore, a transmission time includes a collision detection time.

The CSMA/CD system has the following problems left unsolved. The collision detection time, among others, limits the effective transmission rate in a single system to only about 70% of a transmission rate available with a communication path, as known in the art. In addition, additional information contained in overheads reduces the amount of information to be sent.

Assume that different types of information, e.g., real-time voice information and usual file data exist together. Then, the CSMA/CD system transmits the different types of information by the same procedure. Consequently, voice information, needing real-time communication, is sometimes forced to wait until the end of transmission of file data. More specifically, voice information is apt to be delayed and therefore discontinuous in speech.

Further, the CSMA/CD system lacks an error correcting function although having an error detecting function in the communication procedure. It is therefore a common practice with the CSMA/CD system to assign the correction of an error having occurred in a radio section or interface to an upper-layer communication procedure. Usually, the error correction is implemented by a re-transmitting function available with an upper-layer communication procedure. However, delay ascribable to re-transmitting is not allowable when it comes to voice information that must be real-time. Consequently, interruption of voice information frequently occurs e.g. in private premises in which a communication path is often disconnected or the strength of a radio wave varies due to the movement of a speaker.

The only way available for reducing the interruption of voice information is decreasing the service area of each access point and guaranteeing received field strength or increasing the output power of each terminal. However, increasing the output power of each terminal brings about interference with another terminal.

As stated above, even when the CSMA/CD scheme is applied to a radio LAN system, it is difficult to realize simultaneous transmission of voice information and file data with the LAN system due to the delay particular to the CSMA/CD scheme and errors ascribable to the varying radio wave environment in a radio section.

SUMMARY OF THE INVENTION

It is an object of the present invention to provide a radio LAN system capable of transmitting, with quality comparable with that of a wired LAN system, real-time information and non-real-time information at the same time, and a communication method for the same.

In accordance with the present invention, a radio LAN system comprises an access point forming a limited service area and a station present in the limited service area for transmitting by radio information signals between the access point and the station within the service area. In the radio LAN system, the access point and station each include a transmitter for spreading the information signal with a direct spread spectrum system, which spreads the frequency of the information signal, and transmitting the resulting spread information signal. The access point and station each further include a receiver for receiving the spread information signal and inversely spreading the spread information signal. The transmitter includes a plurality of information transmitting circuits and a transmission controller. The information transmitting circuits each multiply, in the direct spread spectrum system, the information signal and particular one of a plurality of spread codes. The transmission controller selects, in accordance with at least either one of the kind and amount of the information signal, one of frequency bands and frequencies respectively assigned to the information transmitting circuits and one of packets to use for the transmission of the information signal, and maintains transmission power of the spread information signal semi-fixed. The receiver includes a plurality of information receiving circuits and a receipt controller. Each of the information receiving circuits detects the synchronization of the information signal received and multiples the information signal detected by particular one of a plurality of codes for inverse spreading. The information receiving circuits determine a correlation between the resulting multiplied information signals to thereby restore the information signal originally sent from the transmitter. The receipt controller maintains the received power of each spread information signal output from each of the information receiving circuits semi-fixed, and guarantees the level of the spread information signal. The access point further includes a first interface for connecting the access point to a wired LAN system. The station further includes a second interfacing circuit for connecting the station to either one of a public switched telephone network and an apparatus configured to process the information signal.

Also, in accordance with the present invention, a method of transmitting information signals by radio between an access point and a station present in a limited service area in a radio LAN system begins with a step of setting up, as an access system between the access point and the station, a CDMA (Code Division Multiple Access) using a plurality of spread codes for spreading the information signal. The transmission power of the information signal spread is maintained semi-fixed. Subsequently, in accordance with the kind and amount of the information signal, a frequency band and a frequency to be assigned to the information signal and the structure of a packet for transmitting the information signal are selected. Thereafter, the information signal is transmitted in accordance with a transmission procedure.

BRIEF DESCRIPTION OF THE DRAWINGS

The objects and features of the present invention will become more apparent from consideration of the following detailed description taken in conjunction with the accompanying drawings in which:

FIG. 5 shows a total system including the illustrative embodiment of the radio LAN system and a wired LAN system;

FIGS. 6A-6D show packets unique to the illustrative embodiment;

FIG. 7 shows a relation between a data packet transferred in the illustrative embodiment and overheads added thereto;

FIG. 8 is a timing chart demonstrating the transmission of CH (channel) packets for control particular to the system of FIG. 5;

FIG. 9 is a timing chart showing a relation between spread codes based on the kind of the packed used in the illustrative embodiment;

FIG. 10 is a timing chart demonstrating transmission of CH packets for control in an application in which the system of FIG. 5 includes a plurality of access points; and FIG. 11 shows an alternative embodiment of the present invention.

DESCRIPTION OF THE PREFERRED EMBODIMENTS

Figure 1:
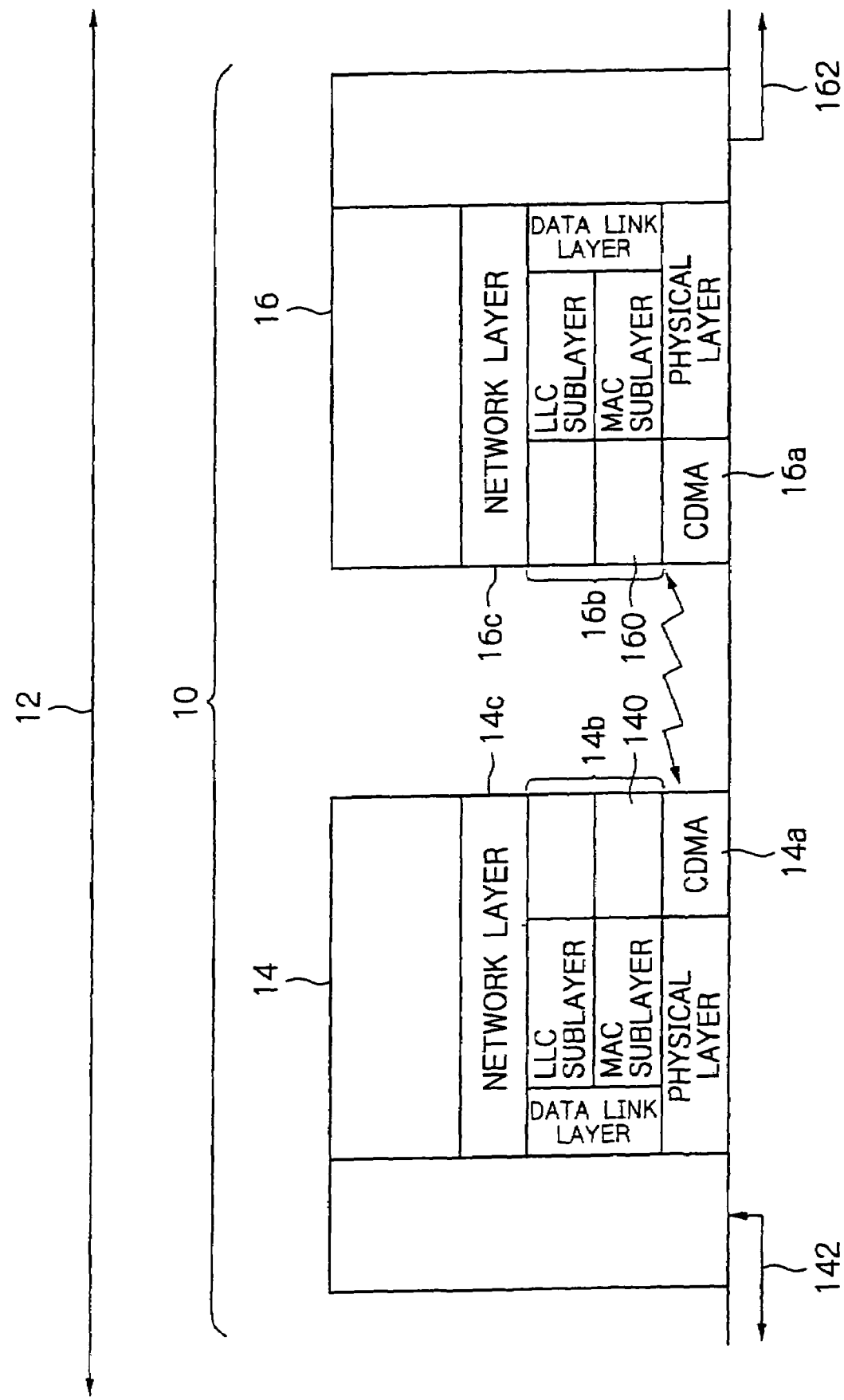
FIG. 1 is a schematic block diagram showing the general layered structure of a radio LAN system embodying the present invention.

Referring to FIG. 1 of the drawings, a radio LAN system embodying the present invention is generally designated by the reference numeral 10. It is to be noted that FIG. 1 shows only part of the radio LAN system 10 relevant to the understanding of the present invention. Signals appearing in the LAN system 10 are designated by reference numerals attached to connection lines on which they appear. As shown, the radio LAN system 10 covers a service area 12 including an access point 14 and a station 16.

The access point 14 includes a physical layer 14a, a data link layer 14b and a network layer 14c arranged in a hierarchical structure. Likewise, the station 16 includes a physical layer 16a, a data link layer 16b and a network layer 16c arranged in a hierarchical structure. The physical layers 14a and 16a both use the direct spread spectrum system as a radio system and have a plurality of spread codes. The physical layers 14a and 16a prescribe electrical, mechanical and other rules.

The data link layers 14b and 16b, lying above the physical layers 14a and 16a, respectively include an LLC (Logical Link Control) sublayer and an MAC (Media Access Control) sublayer, generally 140, and an LLC sublayer and an MAC sublayer, generally 160. The LLC sublayers in the data link layers 14b and 16b mediate between various kinds of MAC sublayers 140 and 160 and the associated network layer 14c or 16c, respectively, so as to absorb differences in access control. The MAC sublayers 140 and 160 each prescribe the construction of a data link layer packet (frame), packet transfer procedure, error detecting method and so forth. Although CSMA/CA (Carrier Sense Multiple Access with Collision Avoidance) is customary with MAC layers for a radio LAN system, the illustrative embodiment uses the CDMA for a multiplexing purpose.

In the illustrative embodiment, transmission power is "semi-fixed" in level at each of the access point 14 and station 16. More specifically, the illustrative embodiment sets the upper limit level of transmission power, but does not strictly limit channel-by-channel power. However, the access point 14 and station 16 each control the transmission power of the entire LAN system 10 in such a manner as to guarantee received field strength.

The access point 14 is connected to an existing LAN, not shown, via a signal line 142. The station 16 is connected to a public telephone network or a personal computer or similar data processing terminal via a signal line 162. How the LAN system 10 is connected to the surrounding network and data processing terminal will be described specifically later.

Figure 2:
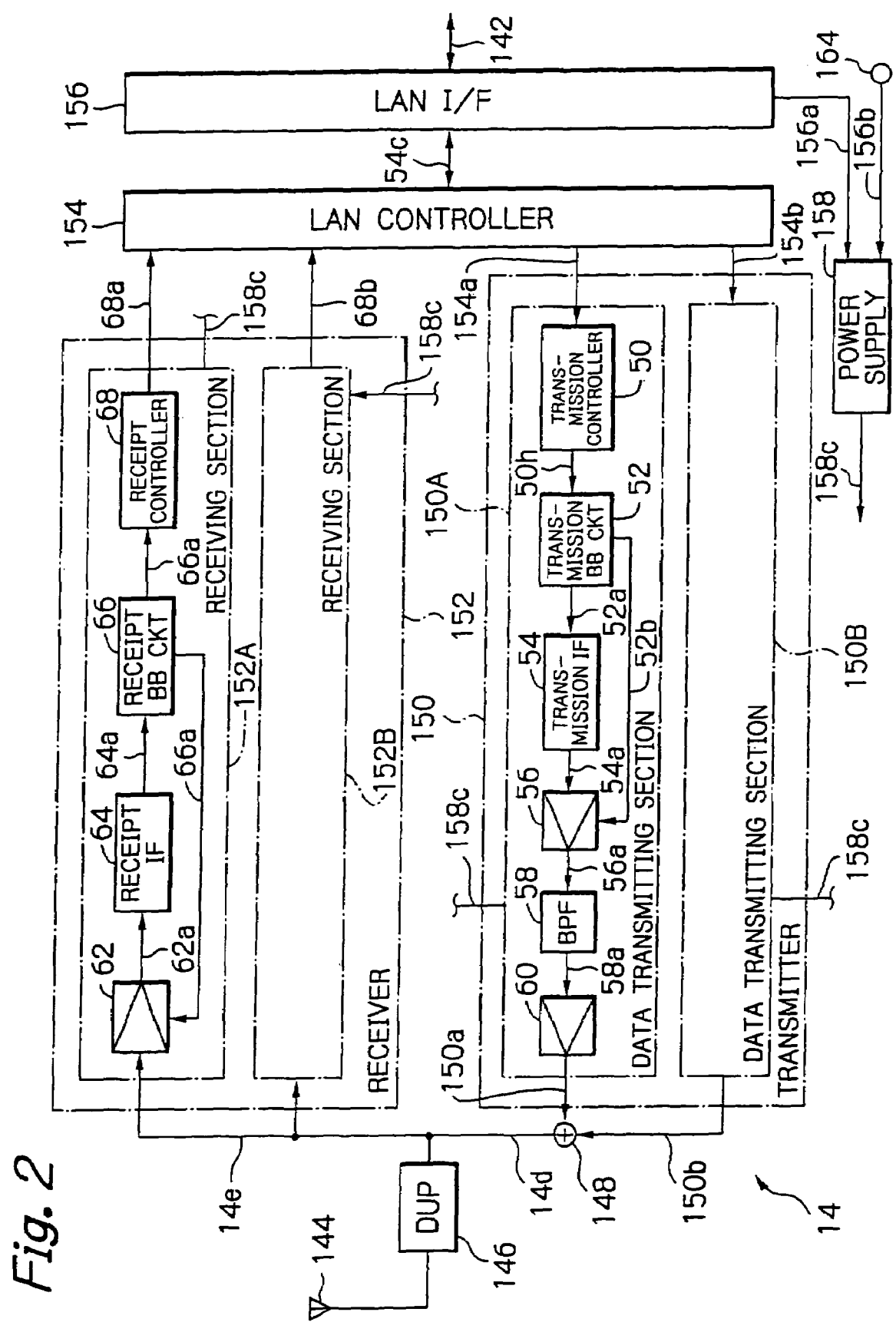
FIG. 2 is a schematic block diagram showing an access point included in the illustrative embodiment.

FIG. 2 shows a specific configuration of the access point 14. As shown, the access point 14 includes an antenna 144, a DUP (antenna DUPlexer) 146, an adder 148, a transmitter 150, a receiver 152, a LAN controller 154, a LAN IF (InterFace) 156, and a power supply 158. The antenna 144 is a linear antenna effectively radiating transmission power output from the access point 14 and receiving an electromagnetic wave from the station 16. The DUP 146 is capable of separating a signal to be radiated via the antenna 144 from a signal coming in through the antenna 144 at the same time. The DUP 146 delivers the above signals to appropriate portions of the circuitry shown in FIG. 2. The adder 148 adds data signals 150a and 150b output from the transmitter 150.

In the illustrative embodiment, the transmitter 150 has two identical data transmitting sections 150A and 150B although the crux is that it has two or more different transmitting sections. The following description will concentrate on the data transmitting section 150A by way of example. The data transmitting section 150A includes a transmission controller 50, a transmission BB (Base Band) circuit 52, a transmission IF (Intermediate Frequency) circuit 54, an AGC (Automatic Gain Controlled) amplifier 56, a BPF (Band Pass Filter), and a power amplifier 60.

Figure 3:
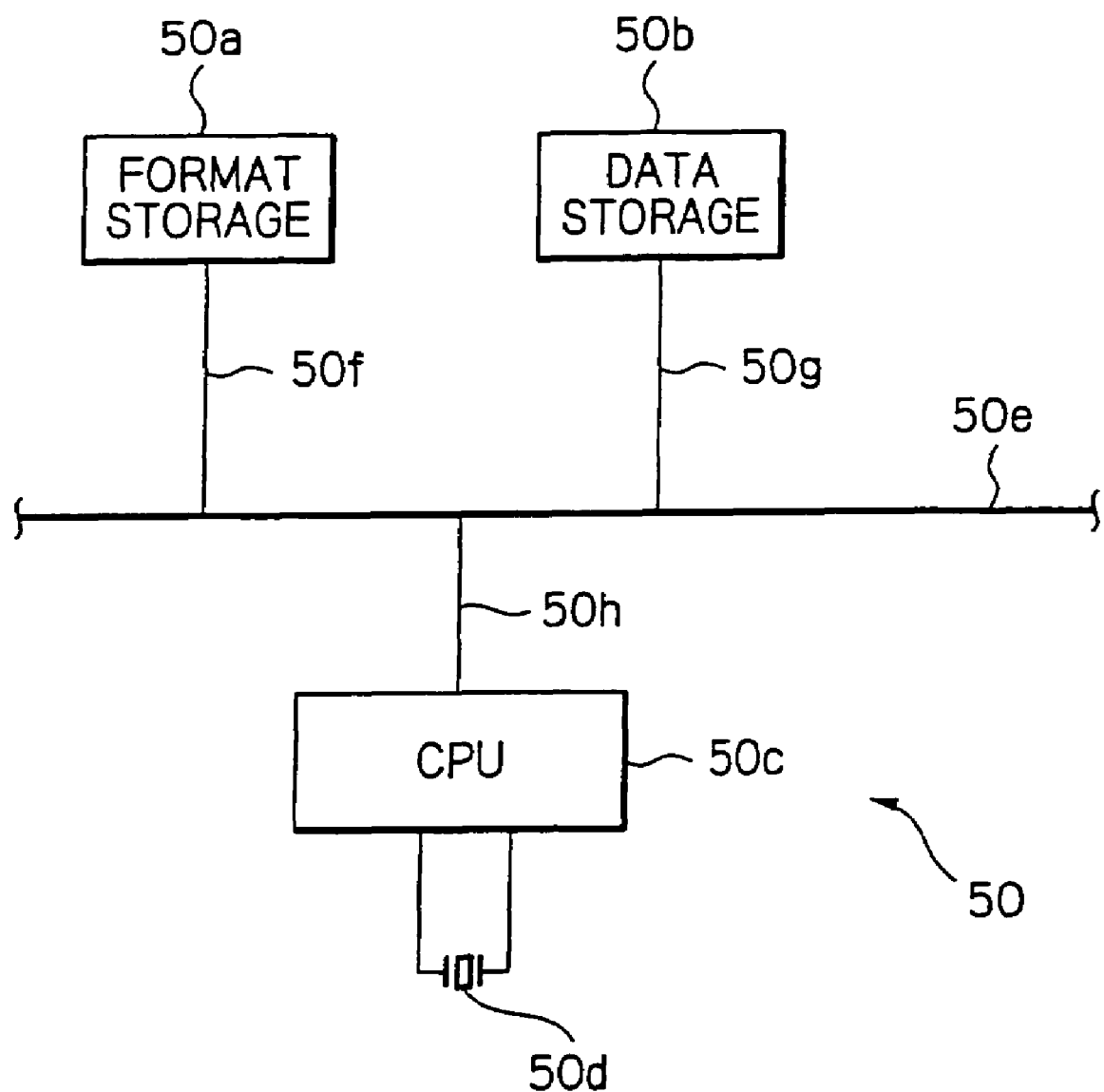
FIG. 3 is a schematic block diagram showing a specific configuration of a transmission controller included in the access point.

The transmission controller 50 adds overheads to data fed from the LAN controller 154 while checking the data for errors. For this purpose, as shown in FIG. 3 specifically, the transmission controller 50 includes a format storage 50a, a data storage 50b, and a CPU (Central Processing Unit) 50c which are interconnected to each other by a bus 50e as depicted. It is to be noted that the configuration shown in FIG. 3 similarly applies to the receipt controller 68 and a controller included in the station 16, which will be described specifically later.

In FIG. 3, the format storage 50a includes a ROM (Read Only Memory) adapted to store format information relating to the overheads, a processing procedure based on the format information, parameters set in the physical layer 14a, FIG. 1, and so forth. The data storage 50b includes a RAM (Random Access Memory) for temporarily storing the data fed from the LAN controller 154, FIG. 2. The CPU 50c processes the data stored in the data storage 50b in accordance with the processing sequence stored in the format storage 50a. The form at storage 50a additionally stores a particular frequency band to be used, and a particular frequency to be used and other information assigned to each kind of information, e.g., voice or file data. The CPU 50c is clocked by a quartz oscillator 50d. The format storage 50a, data storage 50b and CPU 50c are interconnected by the bus 50e and signal lines 50f, 50g and 50h.

The CPU 50c, in operation, reads out a frequency and a frequency band matching with the kind and quantity of data as well as the processing procedure from the format storage 50a. The CPU 50c fetches the data 50f including the fetched information from the format storage 50a via the signal line 50h. The CPU 50c also reads out the data, labeled 50g, from the data storage 50b and processes the data. Subsequently, the CPU 50c outputs the processed data to the bus 50e on the signal line 50h. The transmission controller 50 delivers the processed data 50h to the transmission BB circuit 52.

Referring again to FIG. 2, the transmission BB circuit 52 includes a code generator and a multiplier although not shown specifically. The code generator generators a spread code. The multiplier multiplies the input data 50h by the spread code. While the transmission BB circuit 52 may include a plurality of code generators, the data transmitting section 150A uses a single spread code. A plurality of data transmitting sections will be used when simultaneous multiple access is required.

More specifically, the data 50h input to the transmission BB circuit 52 lies in a narrow frequency band. The transmission BB circuit 52 multiplies the data 50h by the spread code lying in a far broader frequency band than the data 50h, thereby outputting a spread signal 52a having a broad frequency band. The spread signal 52a is input to the transmission IF 54. Further, the transmission BB circuit 52 feeds a control signal 52b to the AGC amplifier 56 in order to guarantee the field strength of a signal to be sent that is above a preselected level.

The transmission IF 54 includes an IF generating circuit and a frequency up-converting circuit although not shown specifically. The IF generating circuit generates a carrier signal. The up-converting circuit multiplies the base-band spread signal 52a by the carrier signal. With this configuration, the transmission IF 54 executes frequency conversion with the spread signal 52a for thereby shifting the base band to a higher frequency band. To set an intermediate frequency, the transmission IF 54 uses a frequency selected by the transmission controller 50 by way of example. An up-converted spread signal 54a output from the transmission IF 54 is input to the AGC amplifier 56. The AGC amplifier 56 amplifies the spread signal 54a to a preselected level for thereby outputting a spread signal 56a with a guaranteed level. The spread signal 56a is input to the BPF 58. If desired, the transmission controller 50 may be adapted to control the signal level.

In the CDMA system, the BPF 58 performs TDD (Time Division Duplex) mode operation with respect to a fixed frequency band. The BPF 58 uses a frequency band selected by the transmission controller 50, although not shown specifically. A relation between the BPF 58 and the TDD mode will later be described more specifically. The BPF 58 feeds the resulting spread signal 58a confined in the preselected frequency band to the power amplifier 60. The power amplifier 60 amplifies the power of the input spread signal 58a. The resulting output of the power amplifier 60 is delivered to the adder 148 as the output signal 150a of the data transmitting section 150A.

In the illustrative embodiment, the receiver 152 also includes two data receiving sections 152A and 152B although the crux is that it includes two or more receiving sections. Because the data receiving sections 152A and 152B are identical in configuration, the following description will concentrate on the data receiving section 152A by way of example. The data receiving section 152A is made up of an AGC amplifier 62, a receipt IF 64, a receipt BB circuit 66, and a receipt controller 68. Basically, the data receiving section 152A executes processing inverse to the processing of the data transmitting section 150A. The DUP 146 separates a received spread signal 14e from a spread signal 14d to be sent out and inputs the signal 14e to the receiver 152.

The AGC amplifier 62 shifts the received spread signal 14e to a level higher than a preselected level in accordance with a control signal 66a output from the receipt BB circuit 66. A spread signal 62a with the shifted level is output from the AGC amplifier 62 to the receipt IF 64. It is to be noted that the spread signal 62a lies in a frequency band fixed by the station 16, FIG. 1, beforehand, as will be described in detail later.

The receipt IF 64 includes an IF generating circuit and a frequency down-converting circuit although not shown specifically. The IF generating circuit generates a carrier signal. The frequency down-converting circuit multiplies the spread signal 62a by the carrier signal for thereby lowering the frequency of the spread signal 62a to the base band. With this configuration, the receipt IF 64 lowers the broadened frequency band of the spread signal 62a to the base band, thereby outputting a spread signal 64a having its center frequency in the base band. The spread signal 64a is input to the receipt BB circuit 66.

The receipt BB circuit 66 includes a synchronization detecting circuit, a code generating circuit, a multiplier and an LPF (Low-Pass Filter) although not shown specifically. The synchronization detecting circuit detects the synchronization of the spread signal 64a. The code generating circuit generates a spread code. The multiplier multiplies the spread signal 64a by the spread code. The spread code output from the code generating circuit is identical with a spread code generated by a transmitting station having transmitted the spread signal. The LPF finds out correlation with the output of the multiplier to thereby output only a base band signal 66a correlated. The LPF can thus output only the necessary signal because the other signals without any correlation are zeros, and yet does not effect the necessary signal at all. The receipt BB circuit 66 delivers the base band signal or received data 66a to the receipt controller 68.

The receipt controller 68 may be identical in hardware configuration with the transmission controller 50 shown in FIG. 3. The receipt controller 68 removes over heads from the received data 66a. The receipt controller 68 may be adapted to additionally control the level of the AGC amplifier 62, if desired. The receipt controller 68 delivers the resulting received data 68a to the LAN controller 154 as the output of the data receiving section 152A. The other data receiving section 152B feeds received data 68b to the LAN controller 154 in the same manner as the data receiving section 154A.

The LAN controller 154 is connected to the LAN I/F 156 by a signal line 154c. The LAN controller 154 controls transmission and receipt from an existing, wired LAN system via the LAN interface 156. Specifically, data 154a and 154b received from the wired LAN system are input to the transmitter 150. Then, the LAN controller 154 analyzes and removes overheads added to the data 154a and 154b by the wired LAN system. On the other hand, the data 68a and 68b are delivered from the receiver 152 to the wired LAN system. Then, the LAN controller 154 analyzes overheads used in the radio LAN system 10, which includes the access point 14 and station 16, and generates overheads matching with the wired LAN system in accordance with the result of analysis.

The LAN I/F 156 is connected to the wired LAN system via the signal line 142 and transmits and receives data to and from the wired LAN system. The LAN I/F 156 executes processing matching with the electrical and mechanical connection of the physical layer of the wired LAN system.

The power supply 158 feeds a particular voltage 158c to each section of the access point 14. The power supply 158 selectively receives a power supply signal 156a or 156b from the LAN I/F 156 or a power supply terminal 164, respectively.

Figure 4:
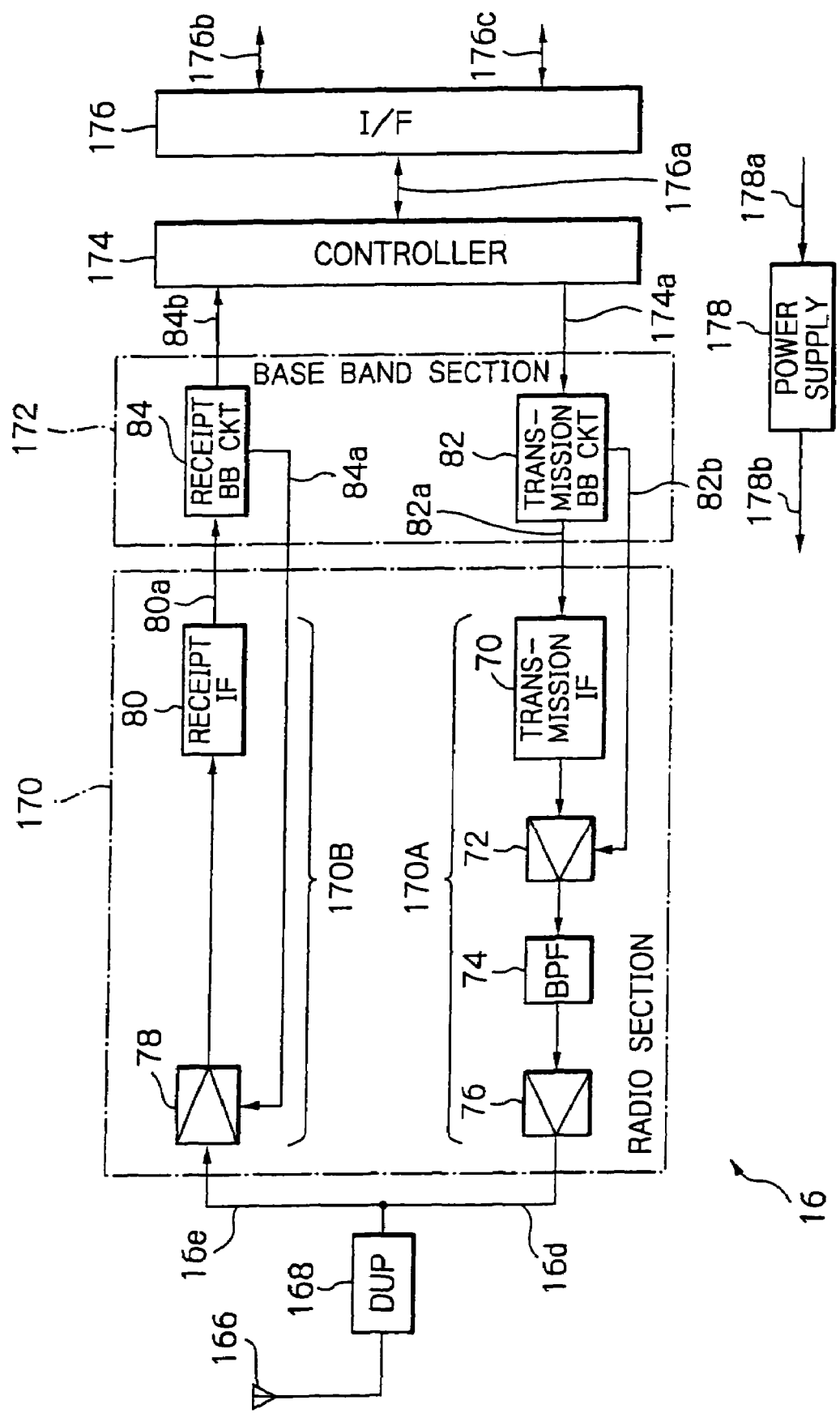
FIG. 4 is a schematic block diagram showing a specific configuration of a station also included in the illustrative embodiment.

Reference will be made to FIG. 4 for describing a specific configuration of the station 16. The station 16 includes some constituents identical with those of the access point 14; the former constituents with the same legends as the latter constituents will not be described in order to avoid redundancy. As shown, the station 16 is generally made up of an antenna 166, a DUP 168, a radio section 170, a base band section 172, a controller 174, an I/F 176, and a power supply 178.

The radio section 170 includes a transmitter 170A and a receiver 170B. The transmitter 170A includes a transmission IF 70, an AGC amplifier 72, a BPF 74, and a power amplifier 76. The receiver 170B includes an AGC amplifier 78 and a receipt IF 80. In the operation of transmission, the base band section 172 delivers a spread signal 82a to the transmitter 170A. The transmitter 170A up-converts the spread signal 82a to a preselected level, limits the frequency band of the spread signal 82a, and then amplifies the power of the spread signal 82a. The resulting high-frequency signal 16d output from the transmitter 170A is delivered to the DUP 168. In the operation of receipt, a received high-frequency signal 16e separated by the DUP 168 is input to the receiver 170B. The receiver 170B controls the level of the received signal 16e to hereby produce a down-converted signal 80a. The AGC amplifiers 72 and 78 respectively control the level in response to control signals 82b and 84a, which are output from the base band section 172. Alternatively, the controller 174 may be adapted to control the AGC amplifiers 72 and 78, if desired.

The base band section 172 includes a transmission BB circuit 82 and a receipt BB circuit 84 each having a spread code for identifying the station 16. The controller 174 feeds a signal 174a to the transmission BB circuit 82. The transmission BB circuit 82 spreads the signal 174a from the base band to thereby produce a spread signal 82a. The spread signal 82a is in turn input to the radio section 170. The receipt BB circuit 84 inversely spreads a signal 80a input from the radio section 170 and feeds the resulting signal 84b to the controller 174.

The controller 174 is basically identical in configuration with the transmission controller 50 described with reference to FIG. 3. The I/F 176 delivers data 176a to be sent to the controller 174. The controller 174a formats the data 176a to match it to the radio LAN system 10, i.e., generates overheads to be added to the data 176a and executes error detection with the data 176a. Formatted data 174a is fed from the controller 174 to the base band section 172. The controller 174 may be adapted to execute error correction in addition to error detection, if necessary. On the other hand, when the receipt BB circuit 84 feeds the received signal 84b to the controller 174, the controller 174 separates a data packet 176a included in the received signal 84b. More specifically, the controller 174 removes the overheads used in the radio LAN system 10. The data packet 176a is input to the I/F 176.

The I/F 176 electrically and mechanically matches the station 16 to an apparatus, not shown, connected to the station 16 while executing processings for transmission or receipt. For example, the I/F 176 transmits and receives data 176b or 176c to and from a telephone or a personal computer, not shown, connected to the station 16. As for those processings, the I/F 176 analyzes and removes overhead when receiving data from the telephone or the personal computer or generates data (added overhead) when delivering the data to the telephone or the personal computer.

The power supply 178 receives a power supply voltage 178a from the outside of the station 16 and feeds a particular voltage and a particular current, labeled 178b, to each section of the station 16.

FIG. 5 shows a specific configuration of the radio LAN system 10. As shown, the radio LAN system 10 covers a service area 12 in which a single AP (Access Point) 14 and three STAs (STAtions) 18a, 18b and 18c are located by way of example. A PC (Personal Computer) 108 is connected to the STA 18a by a signal line 100. Another TEL (TELephone) 110 is connected to the STA 18b by a signal line 102. Another PC 112 and a further TEL 114 are connected to the STA 18c by signal lines 104 and 106, respectively. A signal line 118 connects the AP 14 to a wired LAN 116 constructed by the previously mentioned wired LAN system. Another signal line 122 connects the wired LAN 116 to another service area 120.

In the illustrative embodiment, the CDMA system is applied to each MAC sublayer included in the radio LAN system 10, as stated earlier. Reference will be made to FIGS. 6A-6D for describing a control channel (CH) packet and a data CH packet used in the CDMA system. The data CH packet is distinguished from a channel packet for data to be described later.

As shown in FIGS. 6A and 6B, two different control CH packets are prepared. The access point 14 generates a control CH packet 20, FIG. 6A, and sends it out to the station 16. The station 16 generates a control CH packet 22, FIG. 6B, and sends it out to the access point 14. The control CH packet 20 has the following six fields:

field 20a for frame synchronization (FS),
    field 20b assigned to ID information particular to the access point 14 (AP_ID),
    field 20c assigned to information on channel numbers usable for voice (V) and indicating n channels (V-CH INF.),
    field 20d assigned to information on channel numbers usable for data (D) and indicating n channels (D-CH INF.),
    field 20e assigned to control information and indicating anyone of a location confirmation request, a new registration request, a call request and channel release (CONTROL INF.) and
    field 20f assigned to a frame check sequence for error control (FCS).

In the CONTROL INF field 20e, the location confirmation request commands the station 16 present in the service area 12 of the access point 14 to answer the access point 14. The new registration request commands the station 16 newly entered the service area 12 to send a registration request to the access point 14. The call request commands the station 16 to communicate. Those requests each include ID information unique to the station 16 and a CH number to answer; the ID information includes address information as well as other information.

The other control CH packet 22 has the following four fields:

field 22a for frame synchronization (FS),
field 22b assigned to the ID information of the station 16 (STA_ID),
field 22c assigned to control information and indicating any one of a location confirmation request acknowledgement, a new registration request acknowledgement, a call request acknowledgement, a data communication request and channel release (CONTROL INF.), and
field 22d assigned to a frame check sequence for error control (FCS).

In the CONTROL INF field 22c, the location confirmation acknowledgement and new registration acknowledgement are respectively an answer to the location conformation request and an answer to the new registration request received from the access point 14. The call request acknowledgement is an answer to the call request received from the access point 14. The data communication request requests the access point 14 to communicate. Channel release informs the access point 14 of the release of a channel.

Data CH packets will be described hereinafter, see FIGS. 6C and 6D. A CH packet for data 24, FIG. 6C, has the following six fields:

field 24a for frame synchronization (FS),
field 24b assigned to destination ID information (D ID),
field 24c assigned to source ID information (S ID),
field 24d assigned to the number or the amount of data (NUM. OF DATA),
field 24e assigned to data the amount of which is indicated by the field 24d (DATA), and
field 24f assigned to error control data (FCS).

The length of data stored in the DATA field 24e is variable. The error control data is meant for the fields 24b through 24e.

A CH packet 26 for voice, which is the other data CH packet, has the following five fields:

field 26a for frame synchronization (FS),
field 26b assigned to destination ID information (D ID),
field 26c assigned to source ID information (S ID), field 26d assigned to data (DATA), and
field 26e assigned to error control data (FCS).

The fields 26a through 26d are fixed in data length. Data in the fields 26a through 26d are implemented as an error correction code and subjected to error correction and error detection in the field 26e. For error correction, use is made of FEC (Forward Error Correction). Error correction may not be executed at the beginning of communication, if desired.

The radio LAN system 10 including the access point 14 and station 16 is selectively connected to the wired LAN system 116, the TEL 110 or 114 or the PC 108 or 112, as stated with reference to FIG. 5. Paying attention to the CH packet 24 for data by way of example, a relation between overheads generated at the various sections will be described with reference to FIG. 7.

Assume that the station 16 is connected to the TEL 110 or 114 or the PC 108 or 112. Then, as shown in FIG. 7, part (a), overheads 30a and 30b particular to the TEL or the PC are added to the head and tail of the data field 24e, respectively. In the station 16, the I/F 176 analyzes the overheads 30a and 30b and then removes them. As shown in FIG. 7, part (b), considering the result of analysis, the controller 174 generates the fields 24a through 24d and 24f as overheads particular to the radio LAN system 10. The fields 24a through 24d and the field 24f are added to the head and tail of the data field 24e, respectively. It is to be noted that, among the overheads, the fields 24b through 24d are sometimes absent. The station 16 sends the CH packet 24 with the overheads 24a through 24d and 24f to the access point 14 by radio.

At the access point 14, the receipt controller 68 analyzes the overheads attached to the above CH packet 24, separates data, and then removes the over heads particular to the radio LAN system 10. As shown in FIG. 7, part (c), considering the result of analysis, the LAN controller 154 generates overheads 32a and 32b particular to the wired LAN 116 of the wired LAN system, which is connected to the radio LAN system 10. The LAN controller 154 then adds the overheads 32a and 32b to the head and tail of the data field 24e, respectively. The access point 14 sends the CH packet 24 with the overheads 32a and 32b to the wired LAN 116.

It will readily be seen that data can also be transferred from the wired LAN 116 to the TEL 110 or 114 or the PC 108 or 112 via the radio LAN system 10 when consideration is given to the relation between the generation and the removal of the overheads described above.

On the specific radio LAN system 10 shown in FIG. 5, the operation procedure of the illustrative embodiment will be described hereinafter. In the radio LAN system 10, communication is held between one of the STAs 18a through 18c and the other of the same either directly or by way of the AP 14. The procedure to be described assumes communication effected via the AP 14. After the power-up of the AP 14 and STAs 18a through 18c, the STAs 18a through 18c each report the AP 14 that it is under the control of the AP 14, and requests authentication. In response, the AP 14 authenticates the STAs 18a through 18c one by one in consideration of a particular frequency and a particular code (spread code) unique to the system. In addition, the AP 14 executes authentication when the radio LAN system 10 is increased or reduced in size; otherwise, whether or not communication can be held would become undecided.

More specifically, at the time of authentication, the AP 14 determines control information including a frequency, a chip rate and code assignment in the physical layer. In the illustrative embodiment, the AP 14 assigns a plurality of different control information to each of the STAs 18a through 18c while giving a particular priority order to such control information. More specifically, assume that a period of time to be occupied by a single station increases due to an increase in the number of stations or the amount of data to be interchanged. Then, there may occur that a single combination of control information cannot implement communication or that the effective transmission rate is critically lowered. In light of this, the AP 14 assigns a plurality of different control information to each station, as will be described in detail with reference to FIG. 9 later.

Further, the AP 14 prevents the system from interfering with the system of another access point as to frequency, frequency band and spread code. Management information is stored in the AP 14 beforehand and fed therefrom or is fed from a server or similar equipment connected to the wired LAN 116. Only the AP 14 supplies the STAs 18a through 18c lying in the service area 12 with the management information.

The operation of the illustrative embodiment will be described more specifically hereinafter. On power-up, the AP point 14 sends out the preselected control CH packet 20 to each of the STAs 18a through 18c lying in the service area 12. At this instant, the AP 14 sets semi-fixed transmission power.

This implements a guaranteed level below the semi-fixed level for each of voice and data, while dividing the level within the range below the upper limit. The level may be equally divided or may differ from voice to data, as desired. The AP 14 repeatedly sends out the control CH packet 20 either periodically or non-periodically. The period of packet transmission will be described more specifically later.

On power-up, the STAs 18a through 18c each start monitoring as to the control CH packet 20 to be received from the AP 14. Transmission power is semi-fixed in the physical layer 16a of each of the STAs 18a through 18c as well, as stated earlier. More specifically, the STAs 18a through 18c each monitor the field strengths of signals being received at the frequencies of all control channels. Each of the STAs 18a through 18c then selects a control CH channel having the highest field strength. Subsequently, the STAs 18a through 18c each try code synchronization with the control CH packet selected in order to determine whether or not the control packet sent from the AP point 14 can be received.

So long as the STAs 18a through 18c can receive signals having sufficient field strength, the above monitoring should only continue over a period of time (or a monitoring time) that implements sure channel seizure. However, to reduce the monitoring time, the spread code for control should preferably be about eleven-bit long. In this sense, Berger code unique to IEEE. Std. 802.11 is desirable.

If any one of the STAs 18a through 18c fails to receive data with the control CH packet having the highest field strength, then the STA receives data with another control CH packet having the second highest field strength. The STA then sends an acknowledgement signal to the access point 14.

Subsequently, the AP 14 determines whether or not the STAs 18a through 18c are present in the area 12 on the basis of the acknowledgements of the receipt of the control CH packet 20. More specifically, after sending the control CH packet 20 to the service area 12, the AP 14 determines whether or not it receives the acknowledgement signal N consecutive times from each of the STAs 18a through 18c. The AP 14 determines that any one of the STAs 18a through 18c is present in the service area 12 when received the acknowledgement signal N consecutive times from the STA; otherwise, the AP 14 determines that the STA has left the area 12. The number of times N is a natural number and may be three by way of example.

In the illustrative embodiment, the STAs 18a through 18c each belong to either one of a fixed class and a mobile class. Assume that the STAs 18a through 18c all belong to the fixed class, particularly that they are limited to the fixed class beforehand. Then, a period 28, FIG. 8, at which the AP 14 sends out the control CH packet 20 is fixed, e.g., the AP 14 sends it once for an hour. FIG. 8, part (a), shows a timing at which the AP 14 sends out the control CH packet 20 to the STAs 18a through 18c and a timing at which the former receives acknowledgement signals (ACK) from the latter over the same channel. In FIG. 8, part (a), transmission and receipt are respectively shown above and below lines representative of time.

The AP 14 has at least three different spread codes, as stated previously. The access point 14 sequentially sends the control CH packets meant for the STAs 18a through 18c at times $t_1$, $t_2$ and $t_3$. The STAs 18a, 18b and 18c send out ACK signals to the AP 14, as shown in FIGS. 8, parts (b), (c) and (d), respectively. As soon as the AP 14 receives the ACK signal from any one of the STAs 18a through 18c, it immediately sends out another control CH packet to the next STA without any interval.

As for the mobile class, the AP 14 repeatedly sends out the control CH packets to the STAs 18a through 18c at the period 28 of, e.g., several hundred milliseconds. The AP 14 can therefore frequently locate the STAs 18a through 18c. Further, the AP 14 can sufficiently deal with any one of the STAs 18a through 18c entered the service area 12 and can determine whether or not it has already been registered, as will be described more specifically later.

Subsequently, the AP 14 sends out a new registration request to each of the STAs 18a through 18a existing in the area 12. In response, the STAs 18a through 18c each send a new registration acknowledgement signal to the AP 14. On receiving the new registration acknowledgement signal, the AP 14 registers the STA having transmitted the signal. In this manner, the AP 14 locates the STAs 18a through 18c present in the service area 12.

The CH packet 24 for data and CH packet 26 for voice will be described more specifically hereinafter. As shown in FIG. 9, part (a), specifically, the AP 14 has a plurality of spread codes a, b and c each having a particular length. The STAs 18a and 18b, for example, respectively have the spread codes b and c, as shown in FIG. 9, parts (b) and (c), respectively. The spread codes a and b are assigned to data while the spread code c is assigned to voice. The spread codes a and b and the spread code c are distinguished from each other on the basis of whether or not data is real-time data. In the illustrative embodiment, the distinction is done by each of the AP 14 and STAs 18a and 18b and is not prescribed specifically.

As shown in FIG. 9, a short unit packet length and a long unit packet length are assigned to voice and PC data or similar data, respectively. In this manner, the AP 14 reduces the packet length not by sending out all channel information available with the AP 14, but by sending out only two to three channel information. This is also true with the control CH packet. In FIG. 9, transmission and receipt are respectively shown above and below the lines representative of time. Also, boxes above the lines and boxes below the same indicate the unit lengths of packets transmitted and the unit lengths of packets received, respectively.

Subsequently, when any one of the STAs 18a through 18c accesses the AP point 14, the AP 14 updates information on usable channels. The AP 14 then sends out a data transmission request to the above STA by using the information on the control channels. In response, the STA accessed the AP 14 executes bidirectional data communication by using, among the channels assigned to the previously stated data CH packet for voice or the data CH packet for data, an idle channel with higher priority.

Assume that the TEL 110 or 114 or the PC 108 or 112 sends out end-of-communication information to one of the STAs 18a through 18c connected thereto or that the STA in communication does not receive data from the AP 14 over a preselected period of time. Then, the STA in communication sends forcible channel release information to the associated TEL 110 or 114 or the associated PC 108 or 112 as well as to the AP 14. The STA then releases the channel. The period of time mentioned above may be about one minute.

On the other hand, assume that the AP 14 in the radio LAN system 10 receives data 118 from the wired LAN 116. Then, the AP 14 determines whether or not the destination for which the data 118 is meant is any one of the STAs 18a through 18c present in the service area 12. If the answer of this decision is positive, then the AP 14 sends out a call request to the destination for thereby calling the subject STA.

One of the STAs 18a through 18c having received the call request sends out an acknowledgement signal to the access point 14 by using the usable channel. At the same time, the STA reports the receipt of data to one of the TELs 110 and 114 and PCs 108 and 112 connected thereto. The report should only be suitably sent on the basis of communication protocol shared by the STA and the TEL or the PC. In response to the above acknowledgement, the AP 14 sends out the control CH packet to the subject STA in order to indicate it to shift to the data CH packet. The AP 14 then negotiates with the wired LAN 116 and subject STA as to communication connection for thereby setting up connection, and then effects data communication.

Assume that the AP 14 or any one of the STAs 18a through 18c holding communication in the radio LAN system 10 does not receive data over a preselected period of time, or that the STA holding communication receives the end-of-communication information from the TEL 110 or 114 or the PC 108 or 112 connected thereto or does not receive any data from the AP 14 over the preselected period of time, e.g., about one minute. Then, the STA in communication sends out forcible channel release information to the TEL or the PC and AP 14. In response, the AP 14 suitably transmits to the wired LAN 116 information indicative of forced channel release. On the other hand, when the AP 14 receives forcible channel release information from the wired LAN 116, the AP 14 sends out channel release information to the STA in communication and then releases the channel.

As shown in FIG. 9, communication in the radio LAN system 10 using the CDMA system selectively executes transmission and receipt on the same channel. Because the CDMA system is free from interference between codes, transmission (down-going channel) and receipt (up-going channel) are duplexed between the AP 14 and one of the STAs 18a through 18c sharing the same spread code with each other. For example, the AP 14 shares the spread code b with the STA 18a and shares the spread code c with the STA 18b, as shown in FIG. 9. In this case, the AP 14 switches transmission and receipt between it and each of the STAs 18b and 18c such that they do not overlap each other in each combination. This kind of bidirectional communication system will be referred to as a TDD (Time Division Duplex) mode hereinafter.

While the illustrative embodiment has concentrated on a single AP 14, the radio LAN system 10 may include a plurality of access points each covering a particular service area, as will be described hereinafter. FIG. 10 shows the transmission established by three APs 130, 132 and 134 in parts (b), (c) and (d) thereof, respectively, by way of example. As shown, the APs 130 through 134 each repeatedly sends out the respective control CH packet in particular time slots at a period T. The APs 130 through 134 each monitor the respective service area to see if any station is present. For example, a STA 130a shown in FIG. 10, part (e), is located in the service area of the AP 130. The STA 130a receives control information contained in the control CH packet from the AP 130 and then sends out an acknowledgement packet to the AP 130. Likewise, the AP 132 sends out the control CH packet in the time slots assigned thereto. STAs 132a and 132b respectively shown in FIG. 10, parts (f) and (g), both send out respective acknowledgement packets to the AP 132.

The APs 130, 132 and 134 send out the respective control CH packet sat the period T, as stated above. Therefore, when a station belonging to, e.g., the mobile class newly enters the service area of any one of the APs 130 through 134, a period of time necessary for the station to be registered at the service area is extended. The station, however, can select the optimal access point for radio communication in a shorter period of time. Considering a trade off between the above two points, the illustrative embodiment allows the station to be registered in a period of time substantially as short as conventional one.

As stated above, the illustrative embodiment allows each station to select a particular channel in accordance with the content of communication and selectively send real-time voice or non-real-time usual data. Therefore, even when voice communication using a VoIP (Voice over IP (Internet Protocol)) or similar IP network is applied to a radio LAN system, a delay ascribable to other types of communication are obviated. It follows that a radio LAN system achieves communication quality comparable with the communication quality of a wired LAN system.

The illustrative embodiment further reduces the above delay by selectively using data CH packets in a radio section in accordance with the amount and quality of information, e.g., voice or data. It follows that not only an error detection sequence but also FEC can be executed with packets for voice. The illustrative embodiment therefore frees radio LAN communication from the intermittent interruption of voice by correcting insignificant errors ascribable to momentary changes in electric field, which are particular to radio communication, and there by guarantees QoS (Quality of Service).

Furthermore, the illustrative embodiment is capable of varying not only the packet configuration but also the information transfer rate. Therefore, in a radio LAN system, it is possible to save the frequency band by making the most of the advantages of the direct spread spectrum, which effects communication while maintaining a spread gain constant. The spread gain refers to a ratio of an information transfer rate to a spread code rate or chip rate.

Reference will be made to FIG. 11 for describing an alternative embodiment of the present invention. As shown, this embodiment includes a radio LAN system 200 to which the TDD mode particular to IMT-2000 (International Mobile Telecommunications-2000) is applied. IMT-2000 belongs to a family of state-of-the-art mobile communication systems. The radio LAN system 200 is identical with the radio LAN system 10, FIG. 5, except for the configuration and system of the service area 202. The following description will therefore concentrate on the configuration of the service area 202 dependent on an IMT-2000 AP 204.

Mobile stations of the IMT-2000 cellular phone system, which correspond to the stations, 206 and 208 are assumed to be located in the service area 202. A plurality of cellular phones are connectable to the AP 204. A PC 210 is shown as being connected to the mobile station 206 via an external interface, not shown, which is prescribed or recommended by IMT-2000. The mobile station 206 receives data 206a from the PC 210 to transmit the data to the AP 204, and receives data from the AP 204.

The AP 204 may be connected to a wired LAN system 300 by a wired signal line 212. Also, the AP 204 may be connected to a radio access apparatus (simply radio apparatus hereinafter) 214, which uses another system, by a wired signal line 216. The radio apparatus 214 communicates with another radio apparatus 218 by radio. The radio apparatus 218 is connected to the wired LAN system 300 by a wired signal line 220.

The IMT-2000 radio LAN system 200 has most of the advantages of the previous embodiment and in addition executes transmission power control, thereby further enhancing efficient use of limited channels. The mobile stations 206 and 208 each are connectable to a public switched telephone network outside of the service area 202 and can be used in a VoIP mode via the radio LAN inside of the service area 202. It is to be noted that the mobile stations 206 and 208 should preferably be adaptive not only to an FDD (Frequency Division Duplex) mode customary with a public switched telephone network, but also to the TDD mode inclusive of frequency. The IMT-2000 specifications applied to the radio LAN system 200 make it needless to newly develop, e.g., circuitry for dealing with base band and LSI (Large-Scale Integration circuit) and therefore noticeably reduces the apparatus cost.

The access points included in the illustrative embodiments are only illustrative and may be connected to a PBX (Private Branch Exchange) each. Further, in the case of a radio LAN system constructed at the user's private premises, each access point may be connected to an ADSL (Asymmetric Digital Subscriber Line) or an ISDN (Integrated Services Digital Network). In addition, the radio LAN system may include the CDMA access point and IMT-2000 access point of the illustrative embodiments for selectively communicating with CDMA stations or IMT-2000 cellular phones.

The illustrative embodiments insure the individuality of each type of communication on the basis of whether communication is real-time or not. Therefore, a radio LAN system can transmit and receive information of the kind needing real-time communication, e.g., voice information with minimized delay and quality comparable with the quality of a wired LAN system. Further, the illustrative embodiments assign a particular data structure to each of control, voice and data so as to execute even error correction, thereby guaranteeing QoS and saving the limited frequency band. The radio LAN system therefore reduces interference, promotes the effective use of frequency, and insures signal QoS.

In summary, it will be seen that the present invention provides a radio LAN system allowing an access point and a station to communicate with each other without any interference between spread information signals assigned to different channels. The radio LAN system can therefore send or receive different types of data, e.g., real-time voice and non-real-time usual data at the same time. The radio LAN system of the present invention reduces interference, promotes effective use of frequency, and guarantees signal QoS.

The entire disclosure of Japanese patent application No. 2001-135182 filed on May 2, 2001, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A method of transmitting an information signal by radio between an access point and a station present in a short-range service area in a radio LAN system, comprising the steps of:
    setting up, as an access system between the access point and the station, a CDMA (Code Division Multiple Access) system using a plurality of spread codes for spreading the information signal;
    maintaining transmission power at a guaranteed level below spread semi-fixed level for the information signal;
    selecting, in accordance with a kind and an amount of the information signal, a frequency band and a frequency to be assigned to the information signal and a structure of a packet for transmitting the information signal; and
    transmitting the information signal in accordance with a transmission procedure; and
    storing a particular frequency band and a particular frequency to be used, and other information assigned to each kind of information in advance,
    in said step of selecting, the stored frequency band and the frequency matching with a kind and a quality of data as well as the processing procedure being read out, and each of voice and data being processed as the information signal based on readout information.

2. The method in accordance with claim 1, wherein said transmission procedure comprises:
    a first step of causing the access point to transmit preselected control information to the station present in the short-range service area;
    a second step of causing the station to monitor a radio wave being sent from the access point and containing the preselected control information, and transmit to the access point an acknowledgement signal showing that the station has selected the greatest electric field strength of the radio wave;
    a third step of causing the access point to determine, on receiving the acknowledgement signal from the station, whether or not the station is present in the short-range service area;
    a fourth step of causing the access point to transmit to the station a new registration request for newly requesting registration of the station present in the short-range service area;
    a fifth step of causing the station to transmit, on receiving the new registration request, an acknowledgement of receipt of the new registration request to the access point;
    a sixth step of causing the access point to show, while determining whether or not the station registered is present in the short-range service area, channel information representative of an idle channel when an access request is transmitted from the access point to the station or from the station to the access point, update the channel information, and send out updated channel information;
    a seventh step of causing, when a transmission request is transmitted from an apparatus connected to the station to the station, the station to select a channel in accordance with the updated channel information, send a transmission request to the access point, and transmitting an information signal with a preselected format to the access point in response to an acknowledgement signal that is received from the access point within a preselected period of time;
    an eighth step of causing, when an existing LAN connected to the access point sends a call request to the access point, the access point to determine whether or not the station designated by destination information included in an information signal is present in the short-range service area, assign the channel information to the station if the station is present in the short-range service area to thereby call the station, and transmit an information signal with a preselected format to the station in response to an acknowledgement signal that is received from the station within a preselected period of time;
    a ninth step of causing, when the preselected period of time expires before receipt of the acknowledgement signal from the access point or when a terminal connected to the station transmits end-of-communication information to the station, the station to transmit information indicative of a releases of the channel to the access point or the terminal, respectively; and a tenth step of causing, when the preselected period of time expires before receipt of the answer signal from the station or when the existing LAN transmits end-of-communication information to the access point, the access point to transmit information indicative of a release of the channel to the station or the existing LAN, respectively.

3. The method in accordance with claim 2, wherein the preselected control information comprises a first control packet to be transmitted from the access point to the station and a second control packet to be transmitted from the station to the access point, the first packet comprising a field storing frame synchronization information of the first packet, an information field identifying the access point, a voice channel information field indicative of a channel number available for voice, a data channel information field indicative of a channel number available for data, a control information field indicative of various kinds of request control, and a control data field storing error control data of the first control packet, the control information field storing location confirmation request information for requesting confirmation of a location of the station present in the short-range service area, registration request information for requesting registration of the station newly entered the short-range service area, call information for requesting communication from the access point to the station, and report information indicative of channel release, the second control packet comprising a field storing frame synchronization information of the second control packet, an information field identifying the station, a field storing error control data of the second control packet, and a control information field indicative of various kinds of request control, the control information field of the second control packet storing location acknowledgement information for answering the location registration request information, registration acknowledgement information for answering the registration request information when the station newly enters the short-range service area, call acknowledge information for answering the call information, communication request information for requesting communication with the access point, and report information indicative of channel release.

4. The method in accordance with claim 2, wherein the information signal with the preselected format comprises a channel packet for data and a channel packet for voice used by both of the access point and the station, the channel packet for data comprising a field storing frame synchronization information of the channel packet, a destination information field identifying a destination of the information signal, a source information field identifying a source sent the information signal, a storage information field indicative of an amount of data of the information signal stored, a field storing the information signal, and a storage field storing error control data of the channel packet, each of the destination information field, the source information field, the storage information field and the storage field of the channel packet for data being variable in size, the channel packet for voice comprising a field storing frame synchronization information of the channel packet, a destination information field identifying a destination of the information signal, a source information field identifying a source sent the information signal, a storage field storing the information field, and a storage field storing error control data of the channel packet, each of the destination information field, the source information field and the storage fields of the channel packet for voice being fixed in size.

5. The method in accordance with claim 2, wherein the station belongs to a first class if mobile or to a second class if fixed, as determined by the access point by location confirmation, the preselected control information being repeatedly transmitted to the first class at a period several hundred thousand times as long as a period at which the preselected control information is repeatedly transmitted to the second class.

6. The method in accordance with claim 4, wherein the station belongs to a first class if mobile or to a second class if fixed, as determined by the base station by location confirmation, the preselected control information being repeatedly transmitted to the first class at a period several hundred thousand times as long as a period at which the preselected control information is repeatedly transmitted to the second class.

7. The method in accordance with claim 2, wherein the preselected control information comprises a first control packet to be transmitted from the access point to the station and a second control packet to be transmitted from the station to the access point, the first packet comprising a field storing frame synchronization information of the first packet, an information field identifying the access point, a voice channel information field indicative of a channel number available for voice, a data channel information field indicative of a channel number available for data, a control information field indicative of various kinds of request control, and a control data field storing error control data of the first control packet, the control information field storing location request information for requesting confirmation of a location of the station present in the short-range service area, registration request information for requesting registration of the station newly entering the short-range service area, call information for requesting communication from the access point to the station, and report information indicative of channel release, the second control packet comprising a field storing frame synchronization information of the second control packet, an information field identifying the station, a field storing error control data of the second control packet, and a control information field indicative of various kinds of request control, the control information field storing location confirmation acknowledgement information for answering the location confirmation request information, registration acknowledge information for answering the registration request information when the station newly enters the short-range service area, call acknowledgement information for answering the call information, communication request information for requesting communication with the access point, and report information indicative of channel release, the information signal with the preselected format comprising a channel packet for data and a channel packet for voice used by both of the access point and the station, the channel packet for data comprising a field storing frame synchronization information of the channel packet, a destination information field identifying a destination of the information signal, a source information field identifying a source sent the information signal, a storage information field indicative of an amount of data of the information signal stored, a field storing the information signal, and a storage field storing error control data of the channel packet, each of the destination information field, the source information field, the storage information field and the storage field of the channel packet for data being variable in size, the channel packet for voice comprising a field storing frame synchronization information of the channel packet, a destination information field identifying a destination of the information signal, a source information field identifying a source sent the information signal, a storage field storing the information field, and a storage field storing error control data of the channel packet, each of the destination information field, the source information field and the storage fields of the channel packet for voice being fixed in size.

8. The method in accordance with claim 7, wherein the station belongs to a first class if mobile or to a second class if fixed, as determined by the base station by location confirmation the preselected control information being repeatedly transmitted to the first class at a period several hundred thousand times as long as a period at which the preselected control information is repeatedly transmitted to the second class.

* * * * *

UNITED STATES PATENT AND TRADEMARK OFFICE
CERTIFICATE OF CORRECTION

PATENT NO. : 7,633,907 B2  Page 1 of 1
APPLICATION NO. : 11/446410
DATED : December 15, 2009
INVENTOR(S) : Hiroshi Etoh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 713 days.

Signed and Sealed this

Ninth Day of November, 2010

David J. Kappos
*Director of the United States Patent and Trademark Office*